Feb. 23, 1932.  H. D. WETHLING  1,846,777
AUTOMOBILE LOCK
Filed Feb. 25, 1928

WITNESSES
Francis R. Harris.
Hugh H. Ott

INVENTOR
Harry D. Wethling
BY
ATTORNEY

Patented Feb. 23, 1932

1,846,777

UNITED STATES PATENT OFFICE

HARRY D. WETHLING, OF ORANGE, NEW JERSEY

AUTOMOBILE LOCK

Application filed February 25, 1928. Serial No. 256,955.

This invention relates to locking devices for automobiles and is in the nature of an improvement over my co-pending applications, Serial No. 213,066 and Serial No. 219,513.

In prior application Serial No. 213,066, the switch mechanism is mounted directly behind the instrument board of the vehicle and between the same and the cowl dash. In order to prevent access to the switch mechanism, an expensive steel casing is employed and the wiring is led from the casing through a suitable steel conduit.

In prior application Serial No. 219,513, the hood sections of the motor compartment are locked down by a locking mechanism electrically released by the switch. In order to eliminate the steel casing or housing for the switch mechanism and the steel conduit for the wires, the present invention comprehends the installation of the switch mechanism with the engine compartment beneath the locked down hood sections so that in effect the engine compartment constitutes a housing for the switch mechanism and the necessity of covering the wires is eliminated.

The present invention further comprehends a manipulating means for the switch mechanism which extends through the engine compartment to a point adjacent to operator's seat.

More specifically, the invention comprehends a motor vehicle equipped with means for locking down the hood sections of the engine compartment together with a permutation locked control switch for selectively closing and opening the ignition and releasing the hood locking means, the said switch having a body mounted at a point on the motor vehicle covered by the hood sections and an exposed manipulating means for said switch whereby the locked hood sections of the engine compartment afford the proper protection both for the switch and the wiring against unauthorized tampering.

Other objects of the invention reside in the features of economy of installation and the general efficiency derived therefrom.

With the above recited and other objects in view, reference is had to the following description and accompanying drawings, in which there is exhibited one example or embodiment of the invention, while the appended claim defines the actual scope of the invention.

Figure 1:
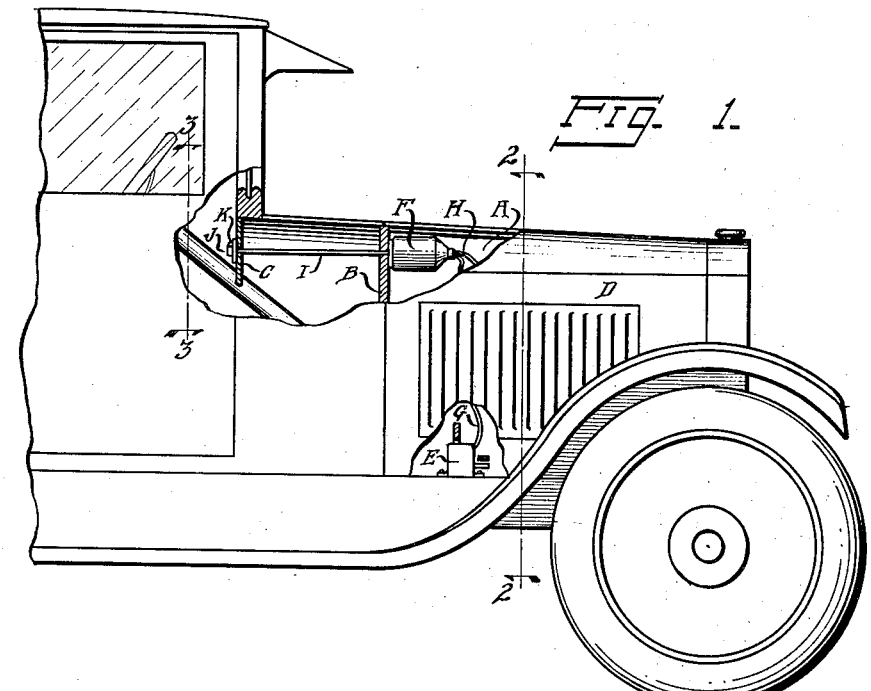
Figure 1 is a fragmentary side view of an automobile equipped with the locking means constructed in accordance with the invention.
Figure 2:
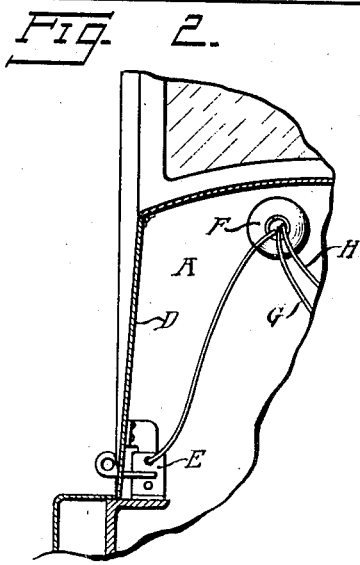
Figure 2 is a fragmentary transfer sectional view taken approximately on the line indicated at 2—2 of Figure 1.
Figure 3:
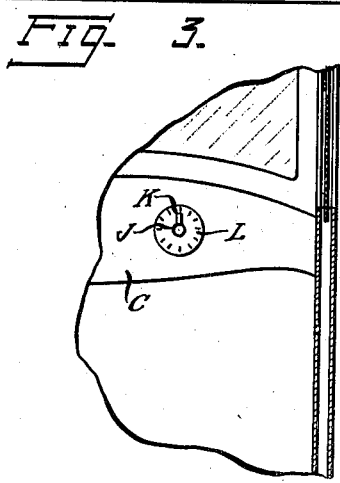
Figure 3 is a similar view taken approximately on the line indicated at 3—3 of Figure 1.

Referring to the drawings by characters of reference, A designates the engine compartment of the automobile. B the cowl board. C the instrument board, and D the hood sections of the engine compartment.

The hood sections D are locked down by locking mechanism E of the type disclosed in my co-pending application Serial No. 219,513, and are designed to be released electrically by proper manipulation of the switch F which in the present instance is supported upon the engine side of the cowl board B and is enclosed within the engine compartment A. The wires G and H which lead from the switch F respectively, to the hood lock release devices and to the ignition are completely enclosed within the engine compartment, and hence it is unnecessary to cover or guard the same with an armored conduit. The manipulating shaft I of the switch F extends rearwardly through the cowl board and through the instrument board C, where it is provided with a manipulating handle J and a pointer K, which coacts with a dial plate L on the face of the instrument board.

From the foregoing it will thus be seen that the controlling switch F disposed under the locked hood sections of the engine compartment, as well as the wiring leading therefrom is adequately housed and protected against tampering, thereby eliminating the necessity of employing expensive steel housings and armored steel conduits.

What is claimed is:

In a motor vehicle equipped with electrical means for locking down the hood sections, a lock controlled switch for selectively closing and opening the ignition circuit and for releasing the hood locking means, said switch having a body mounted at point on the motor vehicle covered by the hood sections and exposed means for manipulating and gauging the opened and closed conditions of said switch.

Signed at Orange, in the county of Essex and State of New Jersey, this 23rd day of February, A. D. 1928.

HARRY D. WETHLING.